(12) United States Patent
Swope et al.

(10) Patent No.: US 12,330,301 B2
(45) Date of Patent: Jun. 17, 2025

(54) SHAPE-MEMORY EFFECTOR ASSEMBLIES WITH INTEGRATED POSITION SENSING

(71) Applicant: ZEBRA TECHNOLOGIES CORPORATION, Lincolnshire, IL (US)

(72) Inventors: Charles Burton Swope, Coral Springs, FL (US); Matthew B. Hayes, Wheaton, IL (US); Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 406 days.

(21) Appl. No.: 17/990,469

(22) Filed: Nov. 18, 2022

(65) Prior Publication Data
US 2024/0165797 A1    May 23, 2024

(51) Int. Cl.
*B25J 9/10* (2006.01)
*B25J 9/00* (2006.01)
(Continued)

(52) U.S. Cl.
CPC ........... *B25J 9/1085* (2013.01); *B25J 9/0009* (2013.01); *B25J 9/12* (2013.01); *B25J 9/1602* (2013.01);
(Continued)

(58) Field of Classification Search
CPC .... B25J 15/0616; B25J 9/0009; B25J 9/1085; B25J 9/12; B25J 9/1602; B25J 9/1664; F03G 7/06143; F03G 7/064
See application file for complete search history.

(56) References Cited

U.S. PATENT DOCUMENTS

| 7,993,108 B2 | 8/2011 | Rush et al. |
| 11,680,559 B1 * | 6/2023 | Rowe .................... F03G 7/0636 60/527 |

(Continued)

FOREIGN PATENT DOCUMENTS

| CN | 112091957 A | 12/2020 |
| CN | 113167249 A | 7/2021 |

(Continued)

OTHER PUBLICATIONS

International Search Report and Written Opinion for International Application No. PCT/US2023/37130 mailed on Mar. 5, 2024.

*Primary Examiner* — Jaime Figueroa
*Assistant Examiner* — Zachary Joseph Wallace (57) ABSTRACT

An effector system comprises: an effector assembly including: a first segment having a conduit between a proximal end and a distal end, an inner surface of the conduit having a conductive portion and a resistive portion; an output member slidable within the conduit, the output member having a conductive exterior contacting the inner surface; a first shape-memory transducer affixed between the proximal end and the output member; and a second shape-memory transducer affixed between the distal end and the output member; and a controller configured to: selectively energize: (i) the first shape-memory transducer to slide the output member in a first direction, (ii) the second shape-memory transducer to slide the output member in a second direction, or (iii) the resistive portion of the inner surface; and in response to energizing the resistive portion, determine a position of the output member.

15 Claims, 8 Drawing Sheets

(51) Int. Cl.
*B25J 9/12* (2006.01)
*B25J 9/16* (2006.01)
*B25J 15/06* (2006.01)

(52) U.S. Cl.
CPC ......... *B25J 9/1664* (2013.01); *B25J 15/0616* (2013.01)

(56) References Cited

U.S. PATENT DOCUMENTS

| | | | | |
|---|---|---|---|---|
| 2013/0296885 A1* | 11/2013 | Desai | ................. | A61B 17/3417 606/130 |
| 2015/0141756 A1* | 5/2015 | Cheng | ...................... | B25J 18/06 604/95.04 |
| 2015/0152852 A1* | 6/2015 | Li | .......................... | D02G 3/448 60/527 |
| 2015/0289994 A1* | 10/2015 | Engeberg | ................. | B25J 9/142 60/527 |
| 2019/0265015 A1 | 8/2019 | Michiwaki | | |
| 2020/0378516 A1 | 12/2020 | Beuschel et al. | | |
| 2022/0018338 A1* | 1/2022 | Brown | .................... | F03G 7/062 |
| 2022/0136488 A1* | 5/2022 | Kazi | ................... | F03G 7/06143 60/527 |
| 2022/0362944 A1* | 11/2022 | Zamani | .................. | B25J 13/086 |
| 2023/0048232 A1* | 2/2023 | Carr | ...................... | G02B 27/646 |
| 2023/0164419 A1* | 5/2023 | Herskovic | ................ | B25J 18/06 348/61 |

FOREIGN PATENT DOCUMENTS

| | | |
|---|---|---|
| EP | 1045141 A2 | 10/2000 |
| EP | 2500146 A1 | 9/2012 |
| JP | S62157280 A | 7/1987 |
| JP | 2000343500 A | 12/2000 |

\* cited by examiner

SHAPE-MEMORY EFFECTOR ASSEMBLIES WITH INTEGRATED POSITION SENSING

BACKGROUND

Various object-handling operations, such as removing objects from shelves or other support structures, can be mechanized and/or automated, e.g., with robotic arms or the like. Mechanization of such operations can include deploying effector assemblies including various actuators including linear solenoids and the like. In some applications, however, the use of actuators such as solenoids can result in complex and bulky effectors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an effector system comprising: an effector assembly including: a first segment having a conduit between a proximal end and a distal end, an inner surface of the conduit having a conductive portion and a resistive portion; an output member slidable within the conduit, the output member having a conductive exterior contacting the inner surface; a first shape-memory transducer affixed between the proximal end and the output member; and a second shape-memory transducer affixed between the distal end and the output member; and a controller configured to: selectively energize: (i) the first shape-memory transducer to slide the output member in a first direction, (ii) the second shape-memory transducer to slide the output member in a second direction, or (iii) the resistive portion of the inner surface; and in response to energizing the resistive portion, determine a position of the output member.

Additional examples disclosed herein are directed to a method, comprising: at a controller, selecting a duty cycle; during a first portion of a time period according to the duty cycle, energizing a shape-memory transducer affixed between an end of a conduit and an output member slidably disposed in the conduit, wherein an inner surface of the conduit includes a conductive portion and a resistive portion, and wherein a conductive exterior of the output member engages the conductive portion and the resistive portion; during a second portion of the time period according to the duty cycle, energizing the resistive portion to complete a circuit including the resistive portion, the output member, and the conductive portion; responsive to energizing the resistive portion, determining a position of the output member based on a measured voltage associated with the circuit.

Figure 1:
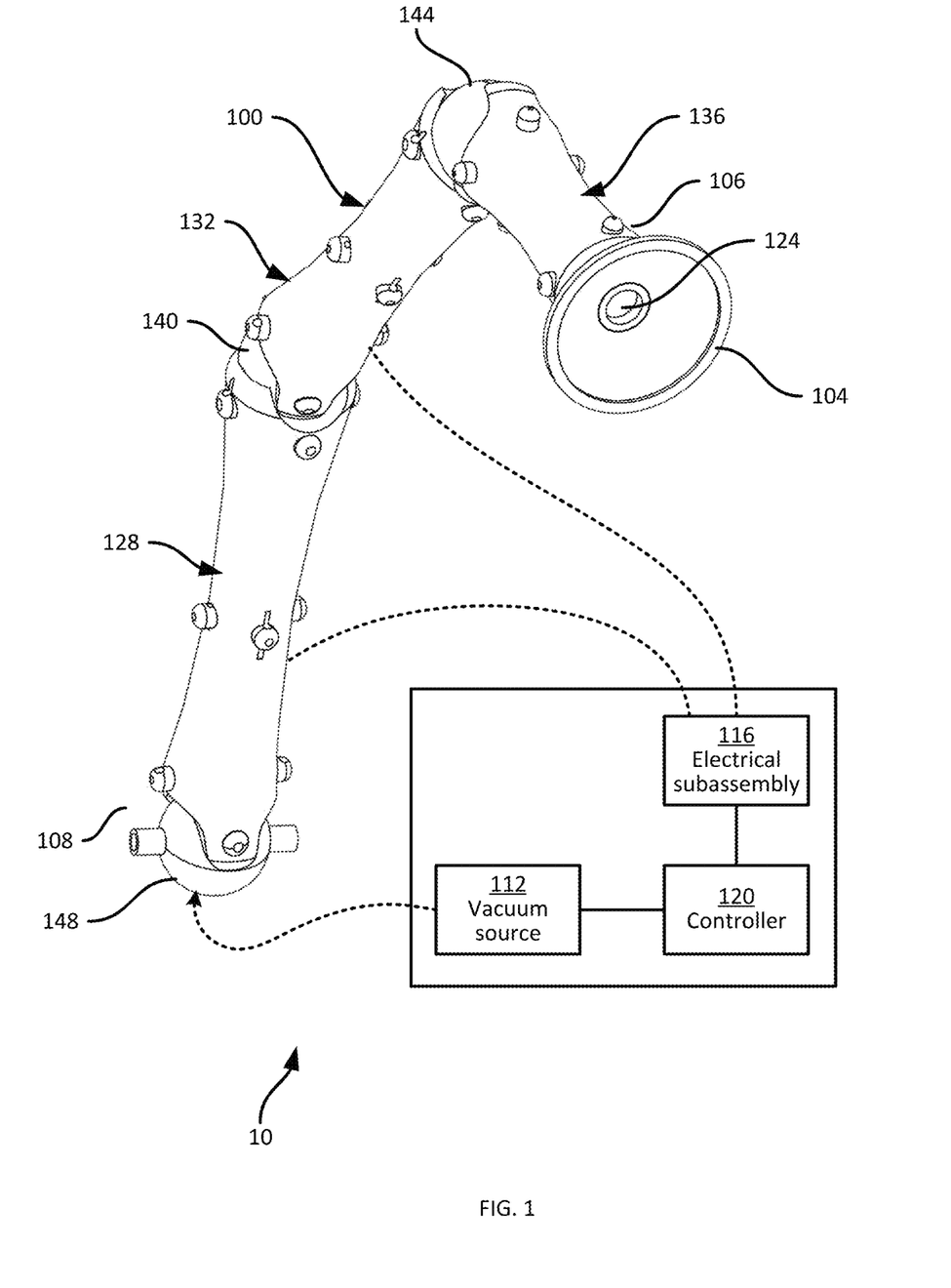
FIG. 1 is a diagram of an effector assembly.

FIG. 1 illustrates an effector system 10, including an effector assembly 100, e.g., for manipulating objects such as packages or other items on support structures such as shelves. The effector assembly 100 is configured to engage with an object via an effector output such as a suction cup 104 at a distal end 106 of the effector assembly 100, opposite a proximal end 108 of the assembly 100. The proximal end 108 can be affixed to a base or other mounting structure of the system 10. The base or other mounting structure can also support further components of the system 10, including a vacuum source 112 (e.g., a pump or the like), an electrical subassembly 116, and a controller 120 (e.g., a field-programmable gate array (FPGA) or the like). The controller 120 is configured to enable and disable the vacuum source 112, to apply a vacuum at a distal effector outlet 124 defined by the suction cup 104. Application of the vacuum at the outlet 124 facilitates engagement between the suction cup 104 and an object such as a parcel or the like on a support structure.

The controller 120 is also configured to control the electrical subassembly 116 to apply electrical signals to various portions of the assembly 100, as discussed below, to articulate and/or move the assembly 100, e.g., to pull the object engaged by the suction cup 104 from a support structure and into a bin or other receptacle for transport.

The assembly 100 includes a plurality of segments, including at least a first segment 128 and a second segment 132. In the illustrated example, the assembly 100 also includes a third segment 136 carrying the suction cup 104. In other examples, the assembly 100 can include additional segments. The segments 128, 132, and 136 are articulated, such that the segment 136 can move relative to the segment 132, and the segment 132 can move relative to the segment 128. In some examples, the segment 128 can also move relative to the base mentioned earlier. Relative movement between adjacent segments is facilitated by respective joints 140 and 144. In some examples, a further joint 148 at the proximal end 108 can permit the segment 128 to move relative to the base.

Movement of the segments 128, 132, and 136 relative to one another is effected by shape-memory transducers disposed within at least the first segment 128 and the second segment 132. The shape-memory transducers are activated by the electrical subassembly 116. Under the control of the controller 120, the electrical subassembly 116 can selectively open or close various circuits defined by the segments 128, 132, and 136 to alter the current state of each shape-memory transducer and thereby effect relative movement between adjacent segments.

Figure 2:
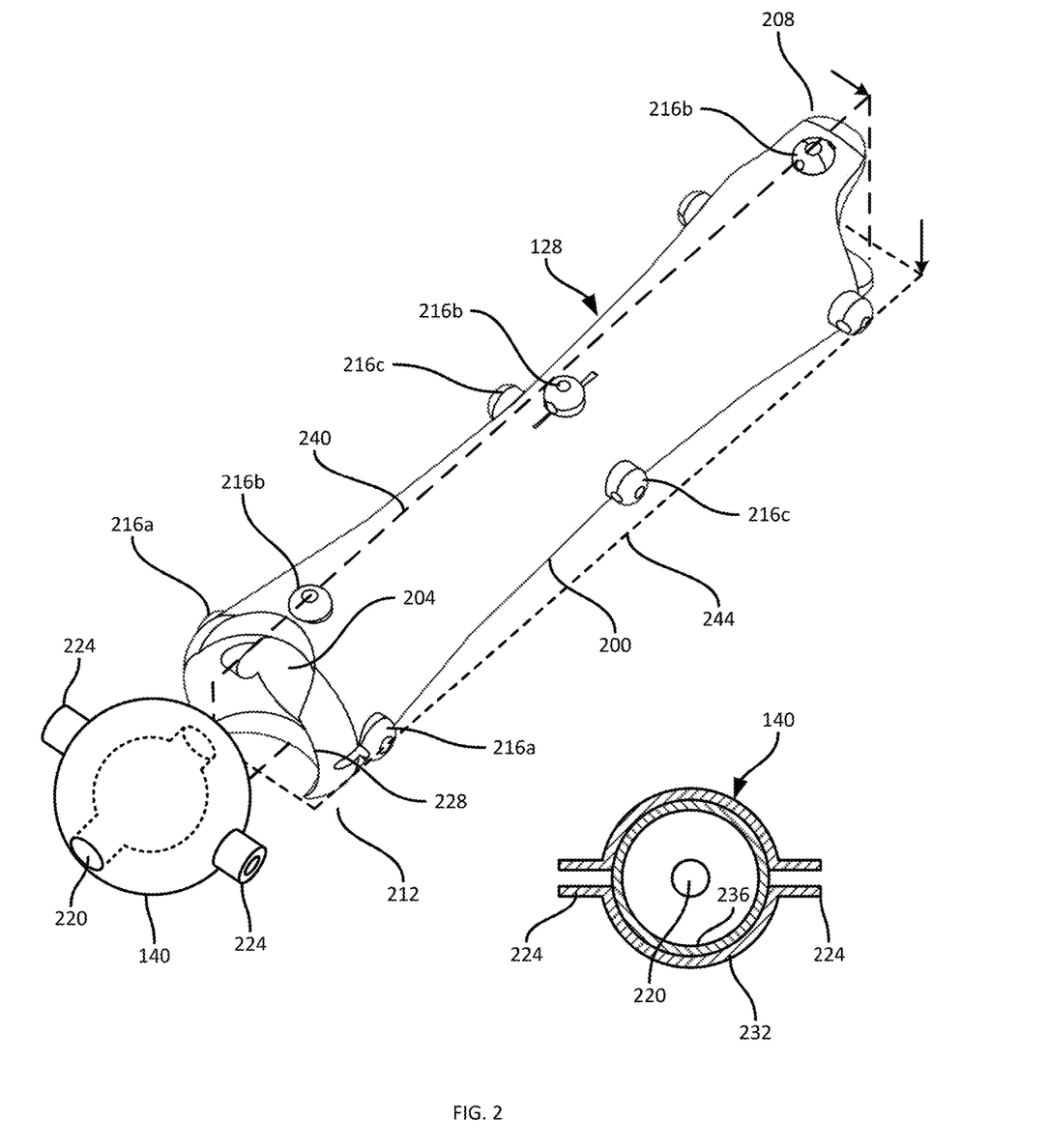
FIG. 2 is a perspective view of a segment of the effector assembly of FIG. 1, and a cross-sectional view of a ball joint of the assembly of FIG. 1.

Turning to FIG. 2, the segment 128 and the joint 140, implemented in this example as a ball joint, are shown isolated from the assembly 100. The segments 132 and 136 share certain structural features with the segment 128. The segment 132, for example, may include the same structural features as discussed below in conjunction with the segment 128, although the segment 132 may have a reduced length between proximal and distal ends in comparison with the segment 128.

The segment 128 includes, as shown in FIG. 2, a generally cylindrical wall 200 defining a conduit (e.g., a hollow channel) 204 extending between a proximal end 208 of the segment 128 and a distal end 212 of the segment 128. The ends 208 and 212 are open, such that the conduit 204 is in communication with the exterior of the segment 128 at either end. The segment 128 also includes a plurality of anchors 216a, 216b, and 216c extending from an outer surface of the wall 200. Certain anchors 216 connect mechanical linkage components (e.g., rods, wires, cables, or the like) between the segment 128 and an adjacent segment (e.g., the segment 132), enabling shape-memory transducers in the segment 128 to move the adjacent segment 132. The linkage components are not shown in FIG. 2 for clarity of illustration. Certain anchors 216 can also receive electrical signal lines, such as conductive wires or the like, for controlling the shape-memory transducers.

In the present example, the anchors 216a can receive a distal end of a mechanical linkage, for moving the segment 128 (e.g., from a proximal segment or from the base mentioned earlier). The anchors 216b can be configured to movably couple mechanical linkage components to the segment 128, e.g., permitting the linkage components to slide in response to movement of the shape-memory transducers. The anchors 216c can connect to the electrical subassembly 116, e.g., to selectively ground the wall 200. The wall 200, or at least an inner surface thereof, can be conductive, and the anchors 216c can be electrically connected to the inner surface.

FIG. 2 also illustrates an example ball joint 140, including a channel 220 extending therethrough to permit air flow through the segment 128 when the ball joint 140 (and, in some examples, additional segments) is connected at the distal end 212 of the segment 128. Each ball joint 140, 144, 148 of the assembly 100 includes a channel 220, such that the conduits defined through each segment 128, 132, and 136 are in fluid communication and a vacuum applied by the vacuum source 112 is communicated to the outlet 124. The ball joint 140 further includes axial protrusions 224. As seen from FIG. 2, the protrusions 224 abut a proximal edge 228 of the segment 128 when the ball joint 140 is installed, restricting the range of motion of the segment 128 about the ball joint 140 to rotation in a single plane containing the conduit (e.g., perpendicular to the protrusions 224).

FIG. 2 also illustrates the ball joint 140 in cross section. As seen in the cross-sectional view, the ball joint 140 includes a non-conductive outer shell 232 (e.g., Teflon™ or the like), and a conductive core 236, e.g., of aluminum, a carbon-fiber based composite, or the like. The protrusions 224 can be open to expose the conductive core 236, enabling electrical signals to be applied to the conductive core 236. As discussed below, the conductive core 236 is connected to the shape-memory transducers, which are electrically activated, and application of electrical signals to the ball joint 140 can therefore control one or more shape-memory transducers.

Figure 3A:
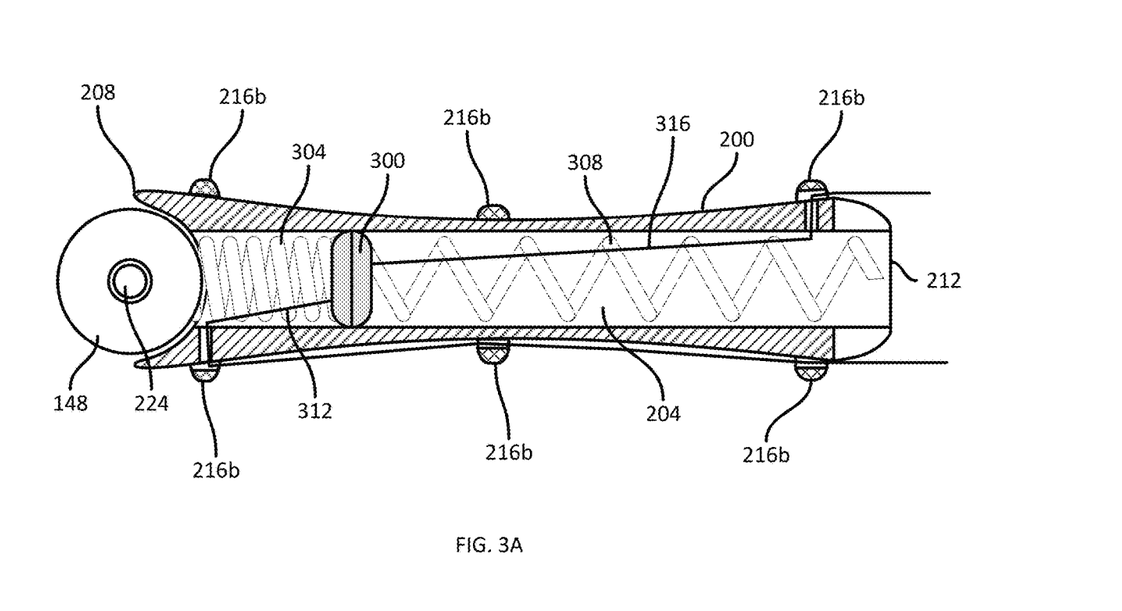
FIG. 3A is a first cross-sectional view of the segment of FIG. 2.
Figure 3B:
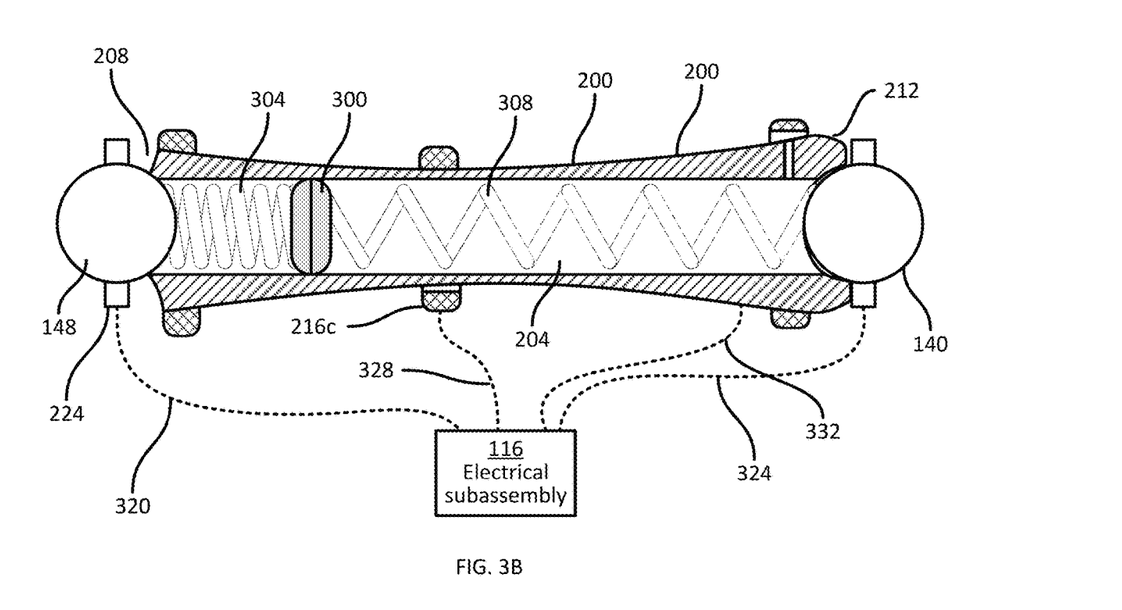
FIG. 3B is a second cross-sectional view of the segment of FIG. 2.

FIG. 3A illustrates a first cross-sectional view taken at the plane 240 shown in FIG. 2, and FIG. 3B illustrates a second cross-sectional view taken at the plane 244 shown in FIG. 2. The cross-sectional views of FIGS. 3A and 3B illustrate various components of the assembly 100 disposed within the segment 128. The conduit 204 houses an output member 300 slidable within the conduit 204, e.g., to place the output member 300 at varying distances from the proximal end 208 and the distal end 212. The output member 300 can be disc-shaped or toroidal, and contacts an inner surface 302 of the wall 200. Further, at least an outer surface of the output member 300 is electrically conductive.

The conduit 204 also houses a first shape-memory transducer 304, affixed between the proximal end 208 and the output member 300, and a second shape-memory transducer 308, affixed between the output member 300 and the distal end 212. The shape-memory transducers 304 and 308 are fabricated from a shape-memory material such as a nickel-titanium alloy, or the like. In the present example, each transducer 304, 308 includes a helical coil of a nickel-titanium alloy, which may be coated with a flexible non-conductive polymer or other non-conductive coating.

The transducers 304 and 308 have shape-memory, in that each transducer has a memory state, to which the transducer returns in response to an environmental stimulus, such as being heated to a threshold temperature. The particular temperature at which a transducer returns to the memory state can be tuned via selection of the specific alloy used for the transducer. Each transducer 304, 308 can therefore be plastically deformed into a deformed state, and remain in the deformed state until application of a suitable stimulus causes the transducer to return to the memory state. In the present example, the transducer 304 is shown in a deformed state, in which the transducer is compressed relative to the memory state of the transducer 304. The transducer 308 is shown in the memory state. In this example, the transducers 304 and 308 have the same physical configuration in the memory state, but in other examples the transducers 304 and 308 may have different memory states from one another.

In the illustrated example, energizing the transducer 304 in the deformed state causes the transducer 304 to forcefully expand towards the memory state. In other examples, the deformed and memory states can be reversed, e.g., such that the transducer 304 is in the memory state, and the transducer 308 is in the deformed state. In such examples, energizing the transducer 308 in the deformed state causes the transducer 308 to forcefully contract towards the memory state.

Each transducer is connected physically and electrically at one end to a ball joint (e.g., the ball joint 148 for the transducer 304, and the ball joint 140 for the transducer 308). Specifically, for example, one end of the transducer can be inserted into the channel 220 of the corresponding ball joint, to engage with the conductive core 236. Further, the opposing end of each transducer is connected physically and electrically to the output member 300. The transducers 304 and 308 are isolated from one another by the output member 300. For example, the output member 300 can include two conductive portions joined by an isolator.

The assembly 100 also includes a mechanical linkage between the output member 300 and an adjacent segment. As shown in FIG. 3A, the linkage includes a first line 312 (e.g., one or more rods, cables, wires, or the like) extending from the output member 300 to an adjacent segment (e.g., the segment 132) via an anchor 216b between the output member 300 and the proximal end 208. The first line 312 extends from the output member 300 to an anchor 216*b* adjacent to the proximal end 208, and then travels towards the distal end 212 for connecting with the next distal segment.

The linkage also includes, in this example, a second line 316 extending from the output member 300 to the adjacent segment via another anchor 216*b* between the output member 300 and the distal end 212. The second line 316 travels in generally the same direction throughout its course, as opposed to the first line 312. The lines 312 and 316 extend in opposite directions from the output member 300, before travelling in a common direction to the adjacent segment (e.g., the segment 132). Movement of the output member 300 in either direction within the conduit 204 therefore applies opposing forces on the lines 312 and 316. For example, movement of the output member 300 towards the distal end 212 exerts tension on the first line 312, and releases tension on the second line 316. Movement of the output member 300 towards the proximal end 208 releases tension on the first line 312, and exerts tension on the second line 316. As discussed below, varying tension applied by the lines 312 and 316 causes the adjacent segment 132 to rotate relative to the segment 128.

Movement of the output member 300 is controlled by the application of electrical signals to the transducers 304 and 308. As shown in FIG. 3B, the assembly 100 includes electrical connections (e.g., conductive wires or the like) from the electrical subassembly 116 to the ball joint 148, the ball joint 140, and an anchor 216*c*. For example, the assembly 100 can include a first electrical connection 320 between the electrical subassembly 116 and the transducer 304 (e.g., via the ball joint 148), a second electrical connection 324 between the electrical subassembly 116 and the transducer 308 (e.g., via the ball joint 140), and a third electrical connection 328 between the electrical subassembly 116 and the anchor 216*c*. The assembly 100 also includes, in the illustrated example, a fourth electrical connection 332 between the electrical subassembly 116 and the segment 128. As discussed further below, the fourth electrical connection 332 can be electrically isolated from the conductive portion of the inner surface of the conduit 204, and can be connected with a resistive element within the conduit 204 that is configured to implement an integrated position sensor for the output member 300.

The electrical subassembly 116 can include a bank of switches or other control circuitry, configured to apply a control voltage to either or both of the ball joints 148 and 140. The electrical subassembly 116 can further open or close a ground circuit connected with the anchor 216*c*, to complete or break a circuit travelling from either or both of the ball joints 140 and 148, through either or both of the transducers 304 and 308, and to the anchor 216*c*.

For example, when the electrical subsystem 116 applies a signal to the ball joint 148, and completes the ground circuit connected to the anchor 216*c*, current flows from the conductive core 236 of the ball joint 148, through the transducer 304 to the output member 300, from the output member 300 to the inner surface of the wall 200, and returns to the electrical subassembly 116 via the anchor 216*c*. The current increases the temperature of the transducer 304, and when the transducer 304 reaches a threshold temperature, the transducer 304 expands to a memory state, moving the output member 300 towards the distal end 212 and compressing the transducer 308 out of a memory state and into a deformed state. The movement of the output member 300 applies or releases tension on the lines 312 and 316 as noted above.

As a further example, application of a signal to the ball joint 140, with the ground connection closed causes current to flow through the transducer 308, biasing the transducer 308 to the memory state and shifting the output member 300 back towards the proximal end 208, as well as deforming the transducer 304. Movement of the output member 300 applies or releases tension on the lines 312 and 316 in a configuration opposite to that applied by movement of the output member 300 towards the distal end 212.

Cooling of the transducers 304 and 308 can be achieved by the application of a vacuum to the conduit 204 from the vacuum source 112. The flow of air through the conduit 204 can accelerate cooling of the transducers 304 and 308 after an activation, facilitating deformation of the transducers 304 and 308.

Figure 4:
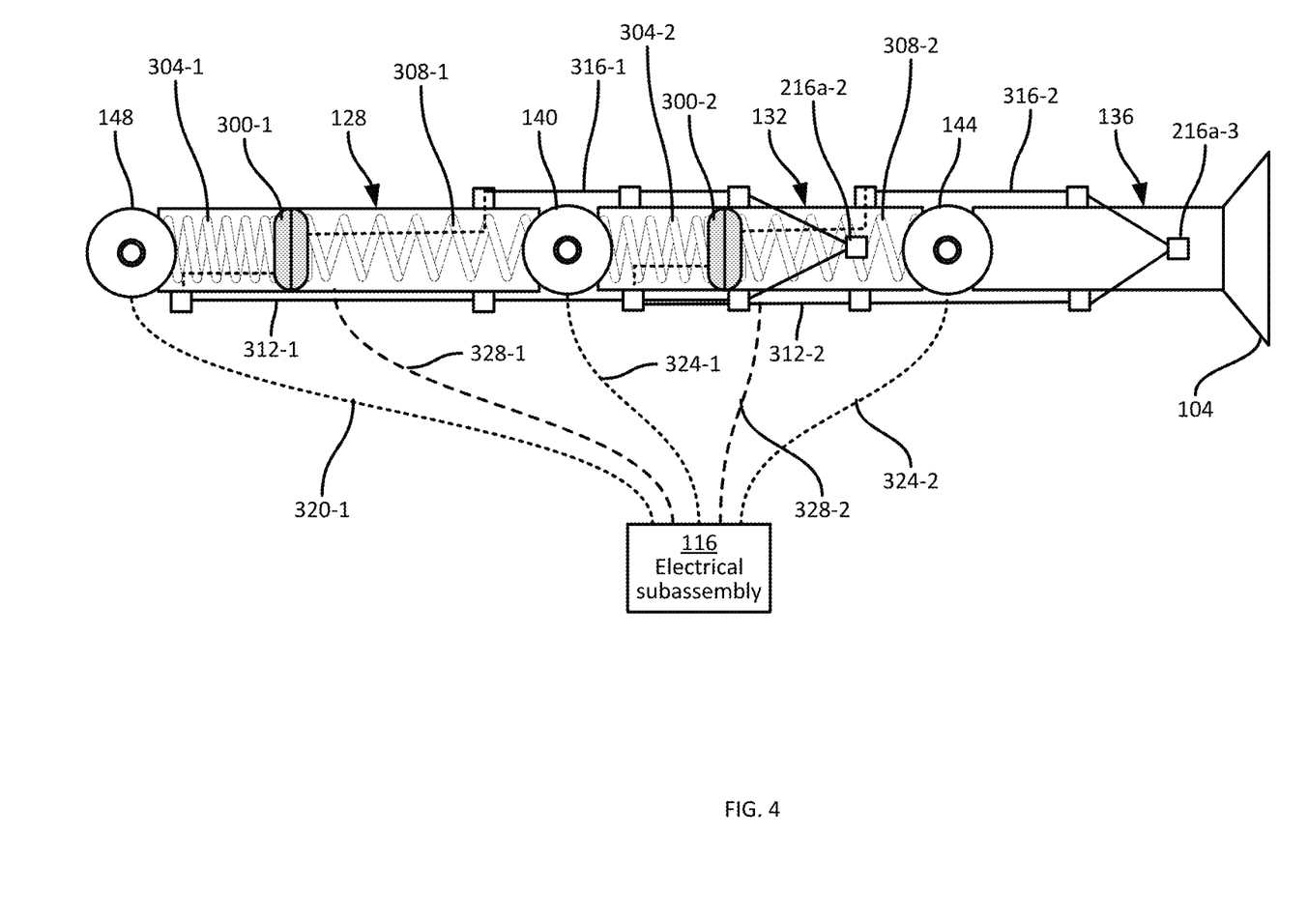
FIG. 4 is a simplified view of the assembly of FIG. 1 in a first operational configuration.

Turning to FIG. 4, a simplified representation of the assembly 100 is illustrated, showing electrical connections 320-1, 324-1, and 324-2 from the electrical subassembly 116 to the ball joints 148, 140, and 144 respectively. In the illustrated example, the electrical connection 324-1 implements both a second electrical connection 324 for the first segment 128, and a first electrical connection 320 for the second segment 132. FIG. 4 also illustrates a ground connection 328-1 from the first segment 128 to the electrical subassembly 116 (the anchor 216*c* is omitted for clarity), and a ground connection 328-2 from the second segment 132 to the electrical subassembly 116. The connection 332 shown in FIG. 3 is omitted from FIG. 4 for simplicity. Various other components of the assembly 100 are also shown, with suffixes introduced according to which of the segments 128, 132, and 136 the components are housed in or on. That is, the segment 128 houses an output member 300-1, transducers 304-1 and 308-1, and linkage lines 312-1 and 316-1. The segment 132 houses an output member 300-2, transducers 304-2 and 308-2, and linkage lines 312-2 and 316-2. Further, selected anchors 216 are labelled, including an anchor 216*a*-2 on the segment 132, and an anchor 216*a*-3 on the segment 136.

In response to one or more commands from the controller 120, the electrical subassembly 116 can close a switch connected with the ground connection 328-1, to ground the segment 128, as well as apply an electrical signal to the ball joint 148 via the connection 320-1. Electrical current therefore flows from the electrical subassembly 116, through the transducer 304-1, and back to the electrical subassembly 116 via the output member 300-1.

Figure 5:
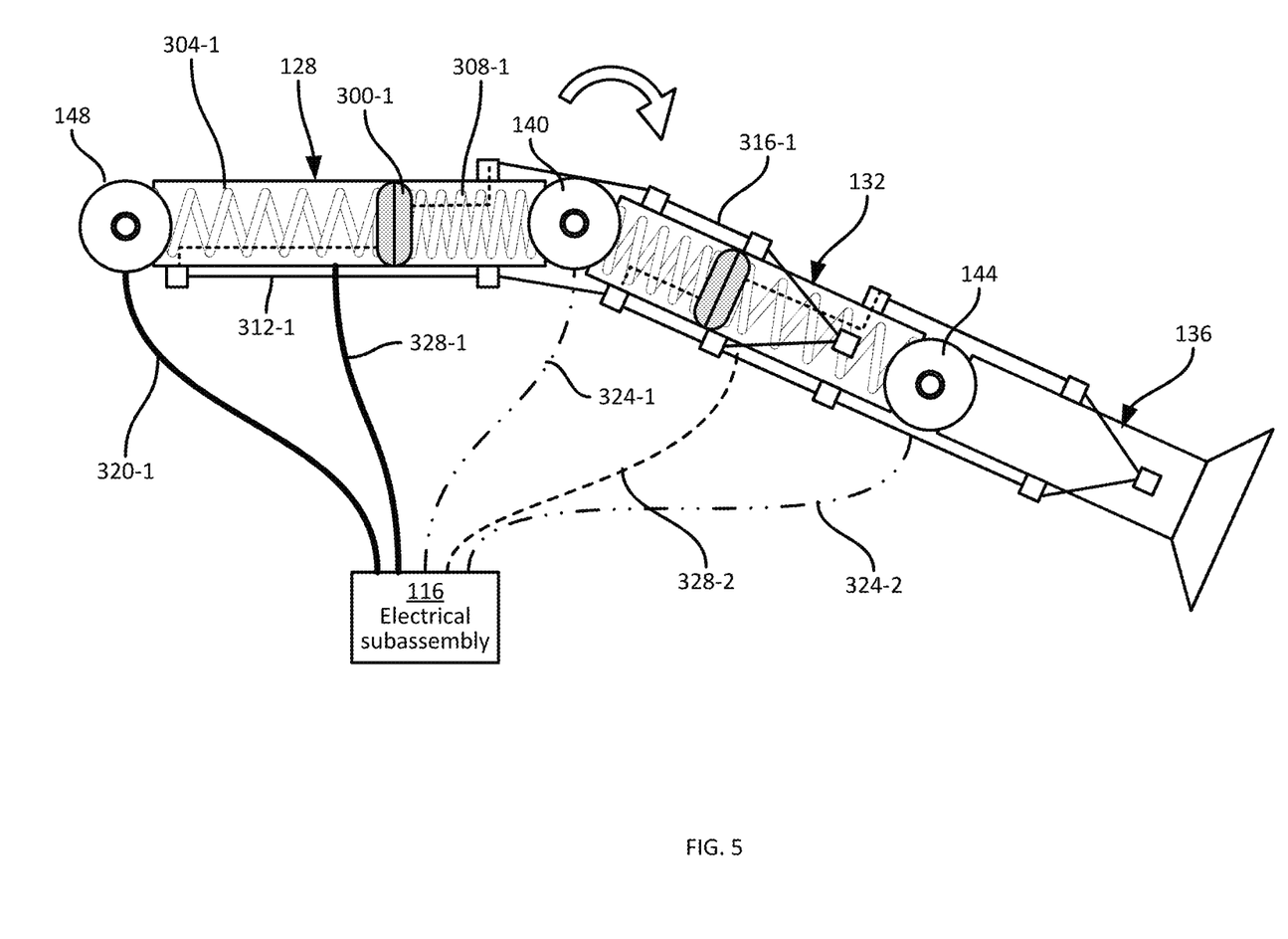
FIG. 5 is a simplified view of the assembly of FIG. 1 in a second operational configuration.

As shown in FIG. 5, in response to the above electrical signal, the transducer 304-1 is biased to the memory state, moving the output member 300-1 towards the segment 132 and deforming the transducer 308-1. Further, the output member 300-1 applies tension to the line 312-1 and releases tension on the line 316-1, causing the segment 132 to rotate about the ball joint 140. As will be apparent, by selectively applying signals to the electrical connections 320 and 324, and opening or closing the ground connections 328, the electrical subassembly 116 can cause bi-directional rotation of each of the segments 132 and 136, e.g., to engage with an object to be manipulated.

The lines 312 and 316, and the connections 320, 324, 328, and 332 can be coupled to the segments via a dielectric sleeve or other coating, e.g., to reduce the risk of tangling or catching on nearby objects. Further, such a sleeve can serve to retain the segments against the respective ball joints.

Figure 6:
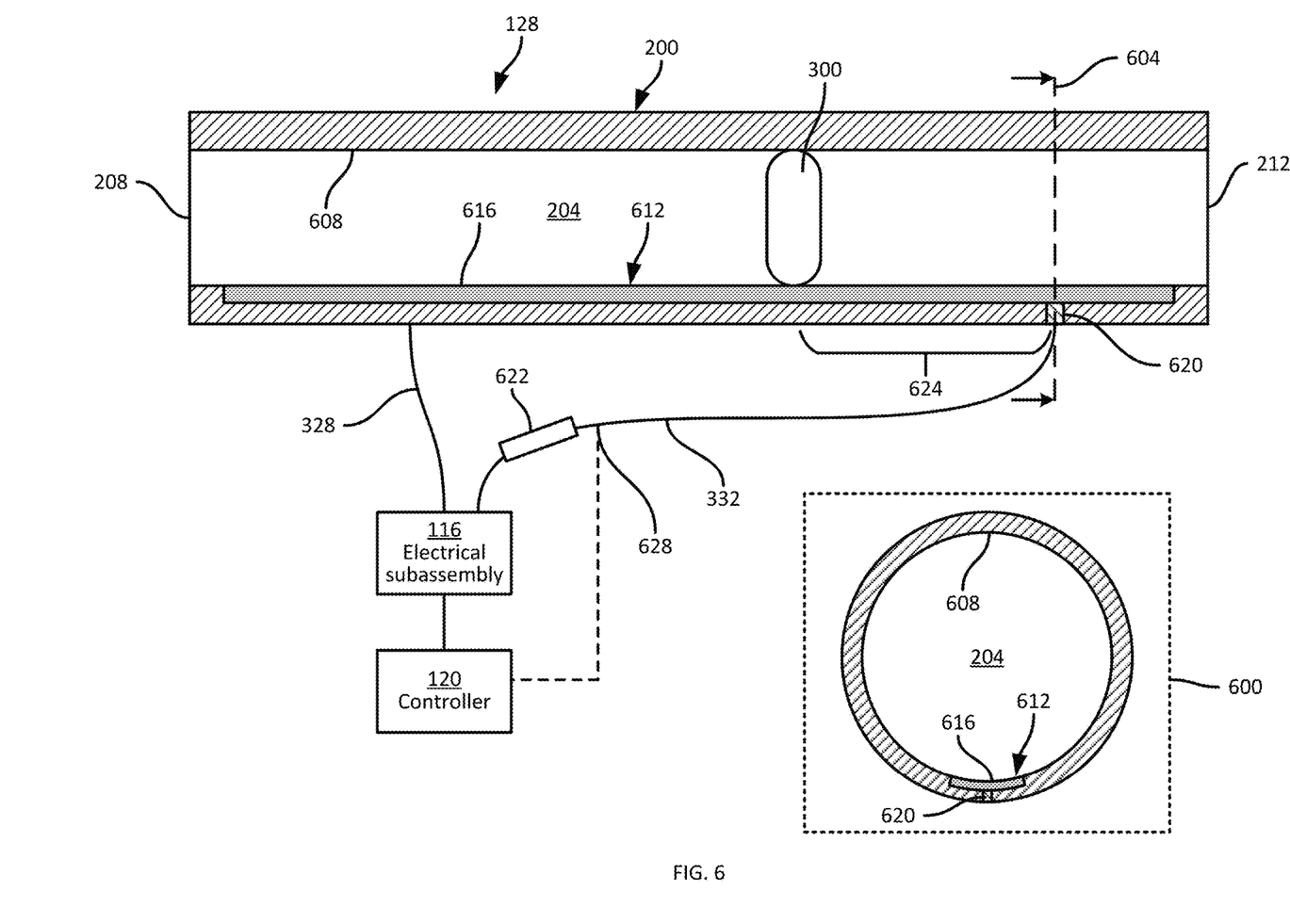
FIG. 6 is a simplified cross section of the segment of FIG. 3B, illustrating an integrated positional sensing circuit.

Turning to FIG. 6, an integrated position sensor functionality implemented by the assembly 100 is illustrated. The integrated position sensing functionality permits the controller 120 to determine a position of the output member 300 within the conduit 204, e.g., expressed as a distance from the proximal end 208 or the distal end 212. The position of the output member 300 can be employed to control further motion of the output member 300 and/or output members 300 of additional segments of the assembly 100, e.g., based on a target configuration for the segments selected by the controller 120 for engaging with a target object. The position of the output member 300 can also be employed by the controller 120 to modify the current supplied to the transducers 304 and/or 308, e.g., to cause partial contraction or expansion of a transducer 304 or 308, and/or to mitigate thermally-induced stress in the shape-memory material of the transducers 304 and/or 308.

FIG. 6 shows a simplified cross section of the segment 128, taken at the plane 244 shown in FIG. 2, and a further cross section 600 taken at the plane 604. The transducers 304 and 308 are omitted from FIG. 6 for clarity. The wall 200 is generally cylindrical, and defines the conduit 204 between the proximal end 208 and the distal end 212. The inner surface of the wall 200, which defines the conduit 204 and may therefore also be referred to as the inner surface of the conduit 204, includes distinct conductive and resistive portions. The wall 200 in the illustrated example is fabricated from a conductive material, and the conductive portion 608 of the inner surface is defined by the conductive material. The segment 128 can further include a resistive member 612, such as a strip of resistive material (e.g., nichrome, a ceramic-metal composite, or the like) recessed into the material of the wall 200. The resistive member 612 defines a resistive portion 616 of the inner surface of the conduit 204. In the illustrated example, the conductive portion 608 and the resistive portion 616 are substantially flush with one another, such that the output member 300 can slide along both portions 608 and 616.

In other examples, the resistive portion 616 can be implemented as a coating on the inner surface of the wall 200. In further examples, the wall 200 can be fabricated from a resistive material, and the conductive portion 608 can be formed by a coating on the inner surface of the wall 200. The resistive portion 616 is fabricated from a material with a greater resistivity than the material forming the conductive portion 608. In some examples, the resistivity of the material forming the resistive portion 616 is at least twice the resistivity of the material forming the conductive portion 608.

The resistive member 612 is electrically isolated from the remainder of the wall 200 (e.g., by a dielectric membrane or other element between the resistive member 612 and the wall 200). In addition, the segment 128 includes a conductor 620 between the resistive member 612 and an exterior of the wall 200, to electrically connect the resistive member 612 with the electrical connection 332. The conductor 620 need not be fabricated from the same material as the resistive member 612 (e.g., the conductor 620 can be made from the same material as the conductive portion 608), and is electrically isolated from the conductive portion 608.

The assembly 100 can also include a resistor 622 electrically connected with the connection 332. For example, the resistor 622 can be integrated with the electrical subassembly 116. The electrical subassembly 116 is controllable (e.g., by the controller 120) to supply current to the electrical connection 332. Current supplied to the electrical connection 332 traverses the resistor 622, and a portion 624 of the resistive member 612. The length of the portion 624 is dependent on the position of the output member 300 within the conduit 204. Because the resistive member 612 is isolated from the remainder of the wall 200, the path taken by current supplied to the electrical connection 332 traverses the resistive member 612 until the output member 300 is reached, followed by the output member and the conductive portion 608 of the inner surface of the wall 200. From the conductive portion 608, the current can return to the electrical subassembly 116 via the electrical connection 328. The electrical connections 332 and 328, the resistive member 612, the output member 300, and the conductive portion 608 form a voltage divider circuit with the resistive member 612 forming a variable resistor. By measuring a voltage at a sampling point 628, the controller 120 can determine the length of the portion 624, and therefore the position of the output member 300, because the voltage at the sampling point 628 varies proportionally with the length of the portion 624.

Figure 7:
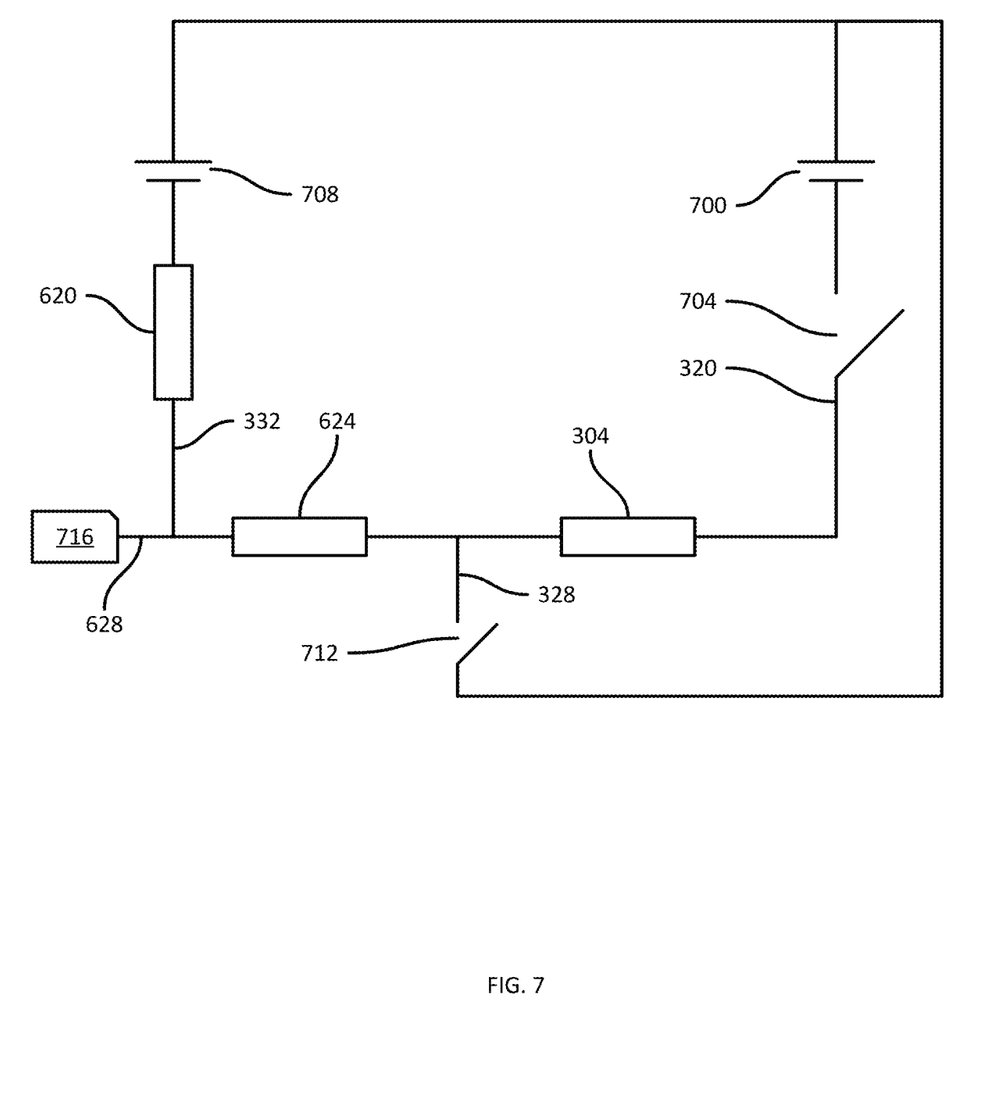
FIG. 7. is a circuit diagram of the integrated positional sensing circuit of FIG. 6.

FIG. 7 illustrates a simplified circuit diagram of the segment 128, illustrating the voltage divider provided by the resistive member 612 and the resistor 622. The electrical subassembly 116 can include one or more power supply circuits, e.g., a primary power supply 700 configured to energize the transducers 304 and 308 via the electrical connections 320 and 324. For simplicity, the connection 324 is omitted from FIG. 7, and the transducer 304 is modeled as a resistor. The electrical subassembly 116 also includes a switch 704 for enabling or disabling the electrical connection 320. The electrical subassembly 116 can also include an auxiliary power supply 708 configured to energize the portion 624 of the resistive member 612. The electrical subassembly 116 further includes a switch 712 to enable or disable the electrical connection 328 (also referred to above as a ground connection). The controller 120 can determine a voltage 716 at the sampling point 628. The voltage 716 varies according to the variable resistance of the portion 624 of the resistive member 612. The controller 120 can, for example, store a look-up table of voltages 716 and corresponding positions of the output member 300.

In operation, the controller 120 can be configured to energize the transducer 304 or the transducer 308 according to a selected duty cycle. For example, the controller 120 can close the switches 704 and 712 and supply current from the power supply 700 for a configurable period of time, and open the switch 704 for a configurable subsequent period of time. The above sequence can be repeated at a configurable frequency, such that current is supplied to the transducer 304 for a certain portion of time (e.g., 60% of each second, though a wide variety of other duty cycles can also be employed). When the switch 704 is open, the controller 120 can activate the integrated position measurement circuit, e.g., by maintaining the switch 712 in the closed position and supplying current to the resistive member 612 from the power supply 708. Energizing the resistive member 612 generates the voltage 716, from which the position of the output member 300 can be determined.

The controller 120 can alternate between energizing the transducer 304, and energizing the resistive portion 612, at a configurable frequency to continuously track the position of the output member 300 as the transducer 304 is heated. Based on the sensed position of the output member 300, the controller 120 can adjust the duty cycle by which the transducer 304 is energized, and/or cease energizing the transducer 304.

Figure 8:
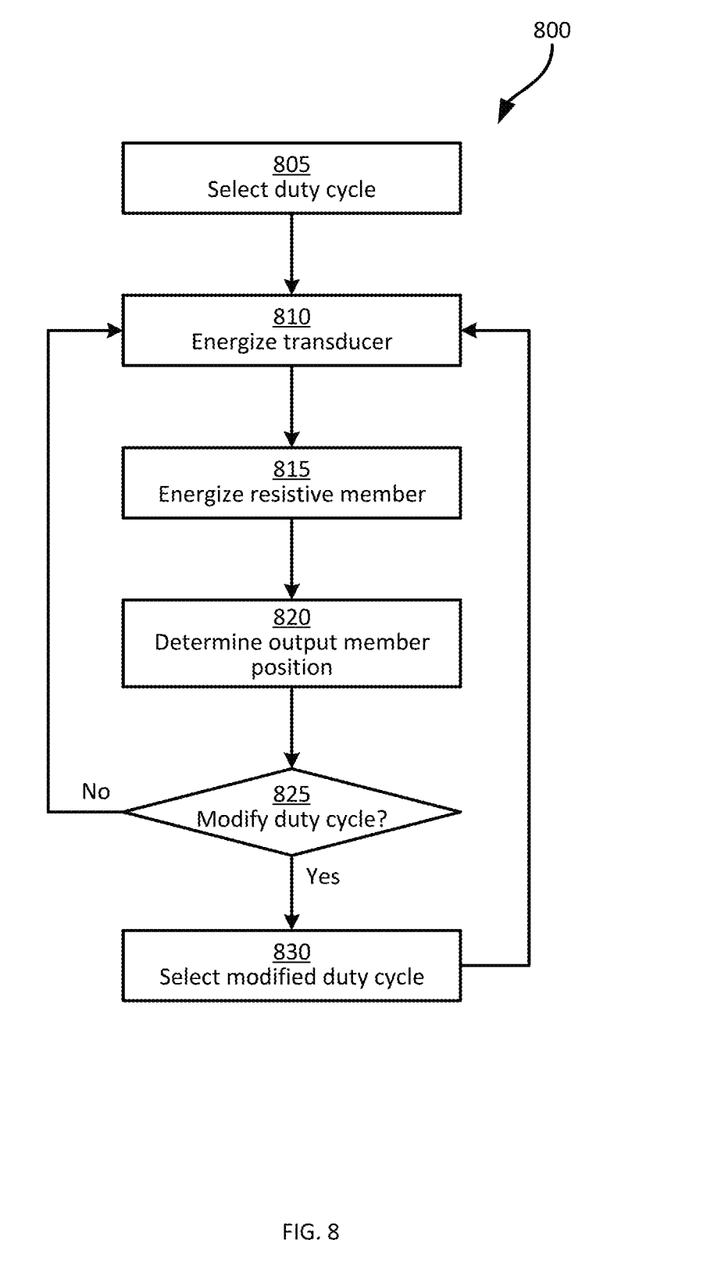
FIG. 8 is a flowchart of a control method for the effector assembly of FIG. 1.

Turning to FIG. 8, a method 800 of controlling the transducers 304 and 308 is illustrated. The method 800 can be performed by the controller 120 via control of the electrical subassembly 116 and measurement of the position of the output member 300. At block 805, the controller 120 is configured to select a duty cycle, e.g., in response to a command, decision, or the like, to activate a transducer (e.g., the transducer 304). The duty cycle selected at block 805 can be a default duty cycle stored at the controller 120, for example. At block 810, the controller 120 is configured to energize the transducer according to the selected duty cycle from block 805. For example, for a duty cycle of 75%, the controller 120 can be configured to energize the transducer 304 for 75 milliseconds, and to disable current delivery to the transducer 304 fora subsequent 25 milliseconds. A wide variety of time periods other than 100 milliseconds can be employed.

At block 815, in response to completion of the energized portion of the time period (e.g., the 75 milliseconds noted above), the controller 120 can be configured to energize the resistive member 612 during the "off" portion during which the transducer 304 is not energized. During the 25 milliseconds of downtime, in this example, the controller 120 is configured to supply current to the resistive member 612, and measure the voltage 716 as discussed in connection with FIG. 7. At block 820, the controller 120 is configured to determine a position of the output member 300, e.g., based on a look-up table, voltage divider equation, or a combination thereof. The position determined at block 820 can be, for example, a distance between the proximal end 208 and the output member 300.

At block 825, the controller 120 is configured to determine whether to modify the current duty cycle (e.g., the duty cycle from block 805 in this iteration). The determination at block 825 can include, for example, determining whether the position of the output member 300 determined at block 820 meets a threshold. When the determination at block 825 is negative, the controller 120 can return to block 810 and continue energizing the transducer 304 and monitoring the position of the output member 300. When the determination at block 825 is affirmative, the controller 120 can select a modified duty cycle, before returning to block 810.

For example, positional sensing for the output member 300 can be used by the controller 120 to determine when to cease energizing the output member 300, e.g., because the output member 300 has transitioned from a first resting position (with the transducer 304 in the deformed state) to a second resting position (with the transducer 304 in the memory state). In other examples, the controller 120 can be configured to reduce the duty cycle (e.g., to apply current less frequently to the transducer 304) when the output member 300 reaches a midpoint between the above resting positions. Such a control action may reduce thermal stress on the transducer 304 and initiate cooling of the transducer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An effector system, comprising:
   an effector assembly including:
      a first segment having a conduit between a proximal end and a distal end, an inner surface of the conduit having a conductive portion and a resistive portion;
      an output member slidable within the conduit, the output member having a conductive exterior contacting the inner surface;
      a first shape-memory transducer affixed between the proximal end and the output member; and
      a second shape-memory transducer affixed between the distal end and the output member; and
   a controller configured to:
      selectively energize: (i) the first shape-memory transducer to slide the output member in a first direction, (ii) the second shape-memory transducer to slide the output member in a second direction, or (iii) the resistive portion of the inner surface; and
      in response to energizing the resistive portion, determine a position of the output member.

2. The effector system of claim 1, wherein the effector assembly further comprises:
   a second segment movably coupled to the distal end of the first segment; and
   a linkage between the output member and the second segment, the linkage configured to move the second segment relative to the first segment in response to sliding of the output member.

3. The effector system of claim 1, further comprising:
   an electrical subassembly having a first electrical connection to the first shape-memory transducer, a second electrical connection to the second shape-memory transducer, a third electrical connection to the conductive portion, and a fourth electrical connection to the resistive portion.

4. The effector system of claim 3, wherein the controller is configured to energize the first shape-memory transducer by controlling the electrical subassembly to (i) enable the first and third electrical connections, and (ii) supply current to the first electrical connection for transmission to the third electrical connection via the first shape-memory transducer, the output member, and the conductive portion.

5. The effector system of claim 3, wherein the controller is configured to energize the resistive portion by controlling the electrical subassembly to (i) enable the third and fourth electrical connections, and (ii) supply current to the fourth electrical connection for transmission to the third electrical connection via the resistive portion, the output member, and the conductive portion.

6. The effector system of claim 5, wherein the controller is further configured to energize the resistive portion by controlling the electrical subassembly to disable the first and second electrical connections.

7. The effector system of claim 3, wherein the controller is further configured to determine the position of the output member based on a measured voltage between a current supply of the electrical subassembly, and the fourth electrical connection.

8. The effector system of claim 1, wherein the controller is configured to alternate between energizing one of the first shape-memory transducer and the second shape-memory transducer, and energizing the resistive portion of the inner surface, according to a duty cycle.

9. The effector system of claim 8, wherein the controller is further configured to modify the duty cycle based on the determined position of the output member.

10. The effector system of claim 1, wherein the first segment includes:
    a conductive wall forming the conductive portion of the inner surface; and
    a resistive member recessed into the conductive wall forming the resistive portion of the inner surface.

11. The effector system of claim 10, wherein the first segment includes a conductor extending from the resistive member to an exterior of the conductive wall.

12. The effector system of claim 10, wherein the resistive member extends from the proximal end to the distal end of the conduit.

13. A method, comprising:
    at a controller, selecting a duty cycle;
    during a first portion of a time period according to the duty cycle, energizing a shape-memory transducer affixed between an end of a conduit and an output member slidably disposed in the conduit, wherein an inner surface of the conduit includes a conductive portion and a resistive portion, and wherein a conductive exterior of the output member engages the conductive portion and the resistive portion;
    during a second portion of the time period according to the duty cycle, energizing the resistive portion to complete a circuit including the resistive portion, the output member, and the conductive portion;
    responsive to energizing the resistive portion, determining a position of the output member based on a measured voltage associated with the circuit.

14. The method of claim 13, further comprising:
    selecting a modified duty cycle based on the determined position of the output member.

15. The method of claim 14, wherein selecting the modified duty cycle includes reducing the duty cycle when the determined position meets a first threshold.

* * * * *